United States Patent
Wadsworth et al.

(10) Patent No.: US 11,571,861 B2
(45) Date of Patent: Feb. 7, 2023

(54) SYSTEM AND METHOD FOR THERMOPLASTIC WELDING USING AN INDUCED THERMAL GRADIENT

(71) Applicant: Spirit AeroSystems, Inc., Wichita, KS (US)

(72) Inventors: Mark Anthony Wadsworth, Sedan, KS (US); Kerrick Robert Dando, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 17/412,440

(22) Filed: Aug. 26, 2021

(65) Prior Publication Data

US 2021/0379840 A1    Dec. 9, 2021

Related U.S. Application Data

(63) Continuation-in-part of application No. 16/663,430, filed on Oct. 25, 2019, now abandoned.

(51) Int. Cl.
| | | |
|---|---|---|
| *B29C 65/00* | (2006.01) | |
| *B29C 65/36* | (2006.01) | |
| *B29C 65/32* | (2006.01) | |
| *B29K 701/12* | (2006.01) | |

(52) U.S. Cl.
CPC .......... *B29C 66/3474* (2013.01); *B29C 65/32* (2013.01); *B29C 65/368* (2013.01); *B29C 66/0244* (2013.01); *B29C 66/1122* (2013.01); *B29C 66/45* (2013.01); *B29K 2701/12* (2013.01)

(58) Field of Classification Search
CPC ... B29K 2701/12; B29C 65/32; B29C 65/386; B29C 65/36; B29C 66/1122; B29C 66/0244; B29C 66/3474
See application file for complete search history.

(56) References Cited

U.S. PATENT DOCUMENTS

| | | | |
|---|---|---|---|
| 5,240,542 A * | 8/1993 | Miller | ................. B29C 66/7212 |
| | | | 156/272.4 |
| 2002/0038687 A1* | 4/2002 | Anderson | ........... B29C 66/0342 |
| | | | 156/275.7 |
| 2014/0249526 A1* | 9/2014 | Kotov | ................... A61L 31/125 |
| | | | 252/514 |
| 2016/0370322 A1* | 12/2016 | Hull | .................... G01M 5/0091 |

FOREIGN PATENT DOCUMENTS

| | | | | |
|---|---|---|---|---|
| WO | WO-0192002 A2 * | 12/2001 | ............. | B29C 70/24 |
| WO | WO-2019231327 A1 * | 12/2019 | ............. | B29C 65/36 |

* cited by examiner

*Primary Examiner* — Daniel McNally
(74) *Attorney, Agent, or Firm* — Hovey Williams LLP

(57) ABSTRACT

A system and method for thermoplastic composite welding comprising a cooling means and a heat source. The cooling means cools a heat-side laminate so as to create a thermal gradient in the heat-side laminate. The heat source heats the heat-side laminate after the cooling step is initiated but before the thermal gradient dissipates so that a first side of the heat-side laminate closer to the heat source does not deform as faying surfaces of the heat-side laminate and another laminate farther away from the heat source are welded together.

25 Claims, 13 Drawing Sheets

SYSTEM AND METHOD FOR THERMOPLASTIC WELDING USING AN INDUCED THERMAL GRADIENT

RELATED APPLICATIONS

This regular utility non-provisional patent application is a continuation-in-part (CIP) and claims priority benefit with regard to all common subject matter of earlier-filed non-provisional U.S. patent application Ser. No. 16/663,430, filed on Oct. 25, 2019, and entitled "SYSTEM AND METHOD FOR THERMOPLASTIC WELDING USING AN INDUCED THERMAL GRADIENT". The identified earlier-filed patent application is hereby incorporated by reference in its entirety into the present application.

BACKGROUND

Thermoplastic composite laminates are often welded together at adjacent faying surfaces via a magnetic induction heat source positioned near a non-faying surface of one of the laminates. The heat source typically has an inverse heat intensity to distance profile, which results in undesired melting or deformation of the non-faying surface.

Heat sinks made of electrically insulative and thermally conductive materials can be positioned between the heat source and the laminates during welding to prevent melting near the heat source, but such materials are rare, expensive, and/or difficult to process. Furthermore, heat sinks increase the heat required and/or slow the welding procedure. Cold fluids have been used to draw heat from the laminates during welding, but this technique is often ineffective because vacuum bags, pressure feet, and other devices used to apply pressure during welding reduce the effective heat transfer coefficient of cold fluids below an acceptable value, thus resulting in a thermal gradient in the laminate near the heat source insufficient to prevent melting or deformation of the laminate's non-faying surface.

Thermoplastic composite laminate welding via magnetic induction heating is often inconsistent due to eddy current resistance variation in the laminates. The variation is caused by several factors including fiber direction and intra-ply fiber spacing, inter-ply spacing. This is problematic because inter-ply fiber electrical resistance varies due to laminate processing parameters and laminate geometry. In particular, more pressure can cause more laminate compaction, male radii thinning due to pressure intensification with radial compaction, and female radii thickening due to bridging effects. Furthermore, initial resin distribution in prepreg material may vary.

During welding, current loops may pass between two faying sides of the laminates, meaning the amount of pressure and fit-up quality can also influence eddy current resistance. The orientation of the induced magnetic field with respect to conductive filaments determines current path, which affects circuit resistance and hence heat flux quantity/distribution. As such, each weld is unique and underserved by generic laminate characterization.

US Pat. App. Pub. No. 20210197497 discloses pre-welding magnetic field strength sensing and adjusting a magnetic field strength parameter for welding according to reference data, but basing a weld on magnetic field strength only affords limited adjustability. Furthermore, adjustments on future welds may be made according to the same reference data even if the previous adjustment is determined to be suboptimal.

Another hindrance to thermoplastic composite welding in many cases is inaccessibility of the backing or substructure (opposing) laminate or the faying surfaces being welding together. Tooling, end effectors, bags, insulations, and other ancillary materials cannot be inserted before welding or removed after welding, which prohibits many laminate securement techniques. However, most thermoplastic composite welding requires an application of pressure to the joint during melting to prevent deconsolidation, and this is only easily accomplished when support tooling or solid structure exists to back up the weld while the two structures are melted together.

U.S. Pat. No. 10,449,749 discloses that electrically insulative reinforcement plies can be inserted between conductive plies to reduce eddy current development and hence heat generation in the heat-side laminate, thereby preventing deconsolidation farther from the faying surfaces. This allows the laminates to remain sufficiently rigid to support themselves during welding. Unfortunately, the insertion of electrically insulative plies changes composite ply spacing and laminate geometry, which negatively affects weld quality.

SUMMARY

Embodiments of the present invention solve the above-mentioned problems and other problems and provide a distinct advance in the art of thermoplastic composite welding. More particularly, embodiments of the invention provide a system and method of welding thermoplastic composite laminates together in which a desired pre-welding thermal gradient is established in the laminates.

An embodiment of the invention is a thermoplastic composite welding system for welding a heat-side laminate and an opposing laminate together. The thermoplastic composite welding system broadly comprises a cooling element and a welding shoe.

The cooling element may comprise a perforated plenum including one or more openings for delivering cold fluid to the heat-side laminate. Alternatively or additionally, the cooling element may comprise a heat sink configured to cool the heat-side laminate by thermal conduction. The heat sink may be cooled by means such as immersion of the heat sink in a cold fluid, circulation of a cold fluid through internal passages within the heat sink, spraying cold fluid onto the heat sink, or by other suitable means.

The heat sink draws heat from the heat-side laminate to cool the heat-side laminate and may be formed of copper, aluminum, or any other suitable thermally conductive material. The heat sink may be formed of an elastomeric or flexible material to enable the heat sink to conform to textures or contours present on the surface of the heat-side laminate.

The welding shoe includes an induction coil and an elastomeric pressure pad for welding the laminates together. The welding shoe may also include a frame or other structural members.

The induction coil includes left and right sides and a magnetic induction region. The left and right sides extend to an alternating electrical power source for passing electrical current through the magnetic induction region. The magnetic induction region is positioned near a bottom end of the welding shoe for generating an alternating magnetic field in the laminates.

The elastomeric pressure pad is positioned near a bottom of the welding shoe below the magnetic induction region of the induction coil. The elastomeric pressure pad promotes contact between the laminates. Specifically, the elastomeric pressure pad promotes compliance to textured or contoured surfaces. The elastomeric pressure pad may comprise the heat sink of the cooling element.

Another embodiment of the invention is a method of thermoplastic welding two laminates together via the above-described welding system. First, the cooling element cools a heat-side laminate in a precooling stage so as to create a thermal gradient therein. For example, a cold fluid may be passed through an internal passage within a heat sink of the cooling element to cool the heat sink. The heat sink may be positioned adjacent to a first side of the heat-side laminate for a period of time, during which the heat sink draws heat from the first side of the heat-side laminate. Alternatively, the cooling element may operate such that the first side of the heat-side laminate may be exposed to a cold fluid for a period of time by means of a perforated plenum or by other means. The period of time during which the heat-side laminate is cooled by the cooling element may be selected to achieve a desired thermal gradient within the heat-side laminate. As such, the first side of the heat-side laminate may be cooled whereas the second side of the heat-side laminate is relatively warmer.

Pressure is then applied to the heat-side laminate and/or the opposing laminate during a heating stage via the elastomeric pressure pad of the welding shoe. This provides compliance to textures or contours of the second side of the heat-side laminate and a first side of the opposing laminate.

The heat-side laminate is then heated in the heating stage via the welding shoe so as to weld the second side of the heat-side laminate and the first side of the opposing laminate (i.e., the faying surfaces) together. Magnetic induction, microwave, radiation, or any other suitable heating mechanism may be used. A temperature of the first side of the heat-side laminate stays below a melt temperature during welding due to the thermal gradient induced during the precooling stage.

The above-described system and method and other embodiments effectively weld two laminates together without melting, deforming, or degrading other portions of the laminates. In particular, a surface of one of the laminates near the heat source is cooled before welding so that its temperature remains below a melt temperature during welding.

Another embodiment of the invention is another method of thermoplastic composite welding two laminates together via a welding system. First, an elastomeric pressure pad of a welding shoe of the welding system is cooled. For example, the elastomeric pressure pad may be introduced to dry ice, liquid nitrogen, a refrigeration cycle, or the like.

The heat-side laminate is then cooled via contact with the elastomeric pressure pad in a precooling stage so as to create a thermal gradient therein. As such, a first side of the heat-side laminate may be cooled whereas the second side of the heat-side laminate is relatively warmer. Pressure is also applied to the heat-side laminate and/or opposing laminate via the elastomeric pressure pad.

The heat-side laminate is then heated in a heating stage via the welding system so as to weld the second side of the heat-side laminate and a first side of the opposing laminate together. A temperature of the first side of the heat-side laminate stays below a melt temperature during welding due to the thermal gradient induced during the precooling stage.

Another embodiment of the invention is a method for thermoplastic welding two laminates together via a thermoplastic welding system. The method includes an in-situ pre-weld test and an in-situ post-weld test.

First, a heat-side laminate is placed on or adjacent an opposing laminate such that their faying surfaces contact each other. The opposing laminate may be inaccessible after the heat-side laminate is placed adjacent to the opposing laminate.

A force applicator is then activated to apply a clamping force to the heat-side laminate against the opposing laminate. The clamping force may be distributed as pressure via an elastomeric pressure pad.

Test circuitry such as an LCR meter connected to a Litz wire coil may then be activated to test an electrical characteristic of the heat-side laminate and/or opposing laminate. For example, a secondary power supply together with a frequency generator and a capacitor may generate a test signal in the Litz wire coil or alternatively an induction coil of a welding shoe of the thermoplastic welding system. The test signal may be a momentary current or any other suitable waveform.

Conductivity, resistivity, impedance, natural frequency, reactance, magnetic field signature, or other electrical characteristics of the heat-side laminate and/or opposing laminate is then measured. This measurement may be compared to a free space test value or other baseline test value.

Welding parameters of the thermoplastic composite welding system are then adjusted or selected according to the measurement. For example, a power level of the primary power supply, spacing of the induction coil from the heat-side laminate, a force magnitude of the force applicator, welding timing, cooling gradient, and other parameters may be adjusted or selected according to the measurement. This step may include looking up welding parameter values corresponding to measurement values in a lookup table.

The thermoplastic composite welding system may then be switched from the test circuitry to a primary power supply for welding. Alternatively, the above testing steps may be performed without testing circuitry (i.e., via the primary power supply and integrated welding circuitry).

The heat-side laminate may then be cooled in a precooling stage so as to create a thermal gradient therein. The cooling step may be performed before pre-weld testing so that a thermal gradient is present during pre-weld testing.

The second side of the heat-side laminate is then welded to the first side of the opposing laminate in a heating stage. Specifically, the primary power supply may provide an alternating electrical current to the induction coil to generate a magnetic field. The alternating magnetic field induces eddy current heating in the heat-side laminate and the opposing laminate.

During welding, a temperature of the second side of the heat-side laminate and the first side of the opposing laminate at least temporarily surpasses a melt temperature such that matrix resin at those sides is molten. Meanwhile, a temperature of the first side of the heat-side laminate, which is closer to the source of heat, peaks below a melt temperature due to the earlier-induced thermal gradient. Additional thermal gradient optimization may be achieved according to the embodiment discussed below.

The induction coil is then turned off to effect a desired maximum temperature of the faying surfaces. The faying surfaces and the first side of the heat-side laminate then begin to cool to an ambient temperature in a cooling stage.

The thermoplastic composite welding system may then be shifted back to a testing mode for post-weld testing. Alternatively, post-weld testing may be performed without testing circuitry (i.e., via the primary power supply and integrated welding circuitry).

The test circuitry is then activated to test electrical properties of the welded heat-side laminate and/or opposing laminate. Specifically, the secondary power supply together with the frequency generator and capacitor generate a test signal in the Litz wire coil or the induction coil. The test signal may be a momentary current or any other suitable waveform and the response can be measured with an LCR meter.

Conductivity, resistivity, impedance, natural frequency, reactance, magnetic field signature, or other electrical characteristics of the heat-side laminate and/or opposing laminate is then measured. This post-weld test may be used to determine a quality or integrity of the weld or to inform better correspondences between welding parameter values and pre-weld measurement values for future welds. To that end, this measurement may be compared to a database of expected electrical characteristic values that indicate a good weld as part of an initial NDI evaluation.

Some or all of the above steps may be repeated for individual welds. Importantly, the thermoplastic welding system may be reconfigured, and welding steps may be tailored, for each weld to accommodate differences in part geometry, laminate structure, material and layup quality, and the like. Unsatisfactory welds (based on the post-weld measurement) may be redone.

The above-described method provides several advantages. For example, in-situ electrical characteristic measuring prior to welding and adjusting or selecting welding parameters based on measured characteristics enables compensation for local material or joint variations for each weld that might otherwise adversely affect weld strength or consistency. In-situ electrical characteristic measuring post welding enables weld qualification and informs better correspondences between welding parameter values and pre-weld measurement values for future welds.

Another embodiment of the invention is a method for thermoplastic welding two laminates together via a thermoplastic welding system. The two laminates include a heat-side laminate having been prepared at a first consolidation pressure so as to have a first electrical conductivity and an opposing laminate having been prepared at a second consolidation pressure higher than the first consolidation pressure so as to have a second electrical conductivity higher (and in one embodiment, at least an order of magnitude higher) than the first electrical conductivity. Consolidation pressures may be achieved via autoclave, stamp forming, vacuum bag, or any other suitable technique. Different consolidation pressures may be achieved by virtue of using different consolidation techniques (e.g., autoclave versus vacuum bag) or by using different pressures via the same consolidation technique (e.g., low pressure autoclave versus higher pressure autoclave). As another example, the heat-side laminate may be a vacuum bag only (VBO) panel while the opposing laminate may be a press consolidated laminate. In one embodiment, the first electrical conductivity may be on the order of approximately 0.65 kS/m, while the second electrical conductivity may be on the order of approximately 11.0 kS/m. This difference in electrical conductivity, and in one embodiment at least one order of magnitude difference in electrical conductivity, between otherwise similar laminates helps achieve melt temperature at the faying surfaces without suffering coil side laminate deconsolidation or far side laminate deconsolidation (i.e., at least portions of the laminates remain sufficiently rigid during heating).

First, the heat-side laminate is placed on or adjacent the opposing laminate such that their faying surfaces contact each other. The opposing laminate may be inaccessible after the heat-side laminate is placed adjacent to the opposing laminate.

A force applicator is then activated to apply a clamping force to the heat-side laminate against the opposing laminate with a welding shoe being positioned adjacent the heat-side laminate. The clamping force may be distributed as pressure via an elastomeric pressure pad. The elastomeric pressure pad may also space an induction coil of the welding shoe from the heat-side laminate to bring the heat-side laminate into a relatively more dispersed and less intense magnetic field region during welding.

The heat-side laminate may then be cooled in a precooling stage so as to create a thermal gradient therein. In this way, the first side of the heat-side laminate may be cooled whereas the second side of the heat-side laminate and the first and second sides of the opposing laminate may be relatively warmer.

The second side of the heat-side laminate is then welded to the first side of the opposing laminate. For example, the primary power supply may provide an electrical current to the induction coil to generate a magnetic field. The magnetic field induces eddy current heating in the heat-side laminate and opposing laminate.

During welding, a temperature of the second side of the heat-side laminate and the first side of the opposing laminate at least temporarily surpasses a melt temperature such that matrix resin at those sides is molten. Meanwhile, a temperature of the first side of the heat-side laminate, which is closer to the source of heat, peaks below a melt temperature due to the earlier-induced thermal gradient and the lower electrical conductivity of the heat-side laminate.

The induction coil is then turned off during the heating stage to effect a desired maximum temperature of the faying surfaces. The faying surfaces and the first side of the heat-side laminate may then begin to cool to ambient temperature in a cooling stage.

The above-described method provides several advantages. For example, the difference between the electrical conductivity of the heat-side laminate and the electrical conductivity of the opposing laminate helps ensure melting is centered near the faying surfaces while preventing coil side laminate deconsolidation, and the distance from the induction coil prevents far side laminate deconsolidation. Spacing the induction coil from the heat-side laminate also brings the heat-side laminate into a relatively more dispersed and less intense (i.e., flatter part of the intensity versus distance curve) magnetic field region during welding, further ensuring melting is centered near the faying surfaces while preventing coil side laminate deconsolidation and opposing side laminate deconsolidation. This is particularly useful when external support cannot be used such as with inaccessible close-out joints.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
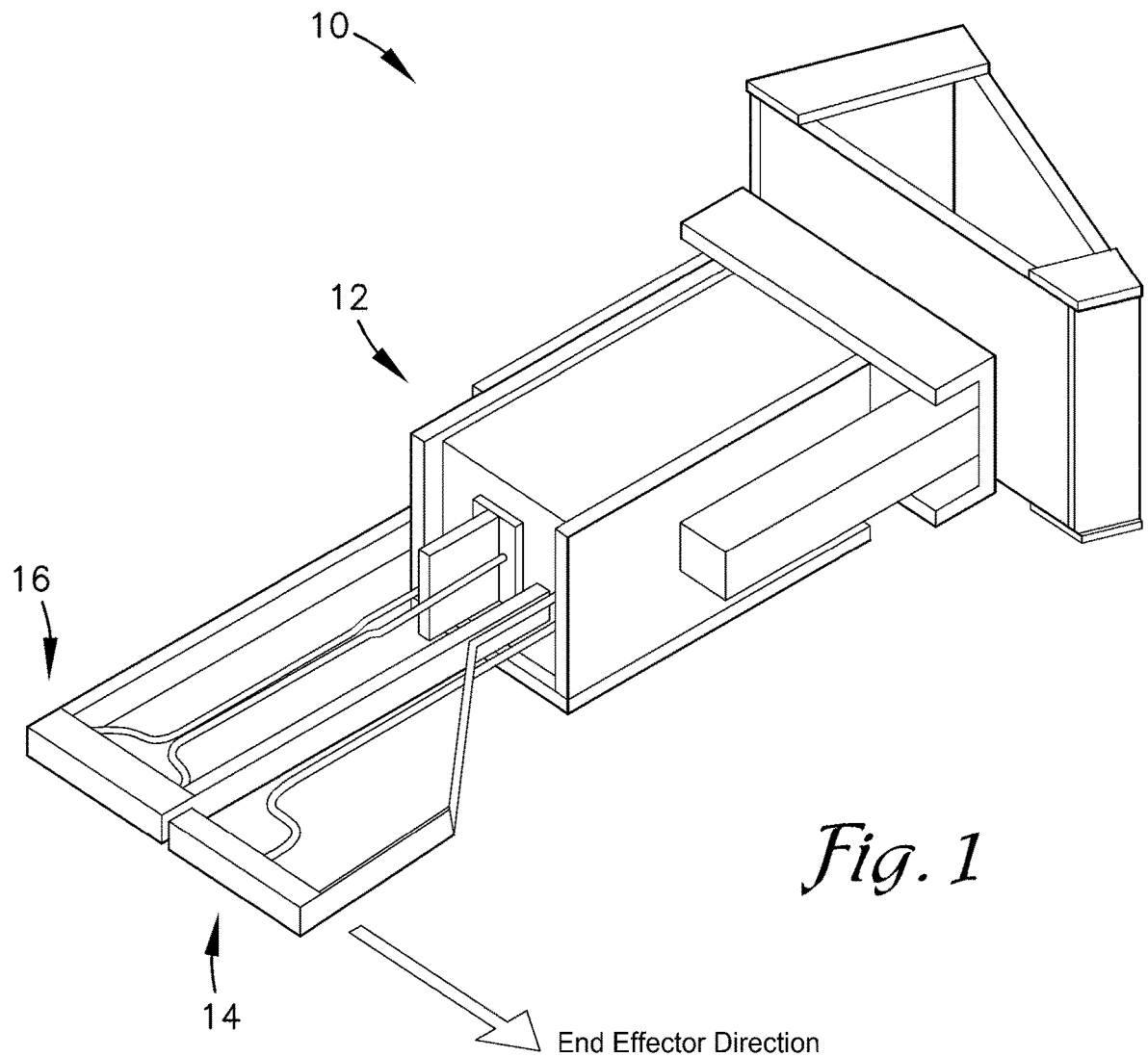
FIG. 1 is a perspective view of a thermoplastic composite welding system constructed in accordance with an embodiment of the invention.
Figure 2:
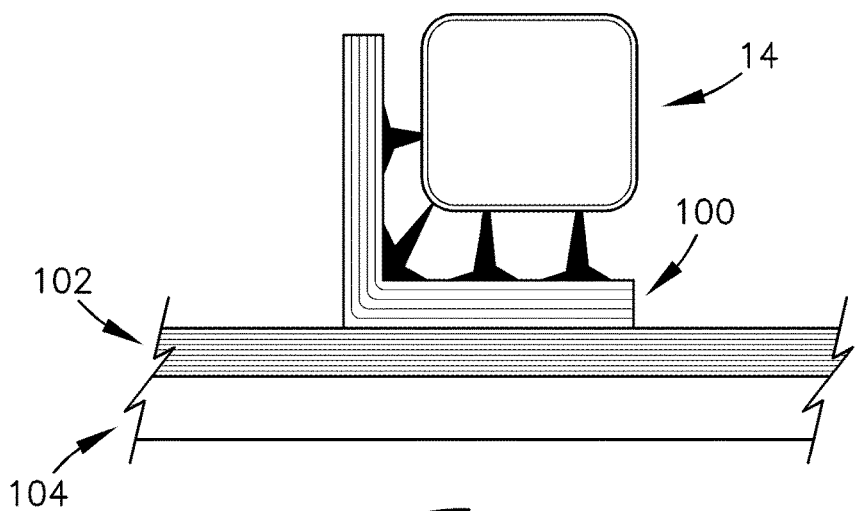
FIG. 2 is a side cross section view of a cooling element comprising a perforated plenum of the welding system of FIG. 1.
Figure 3:
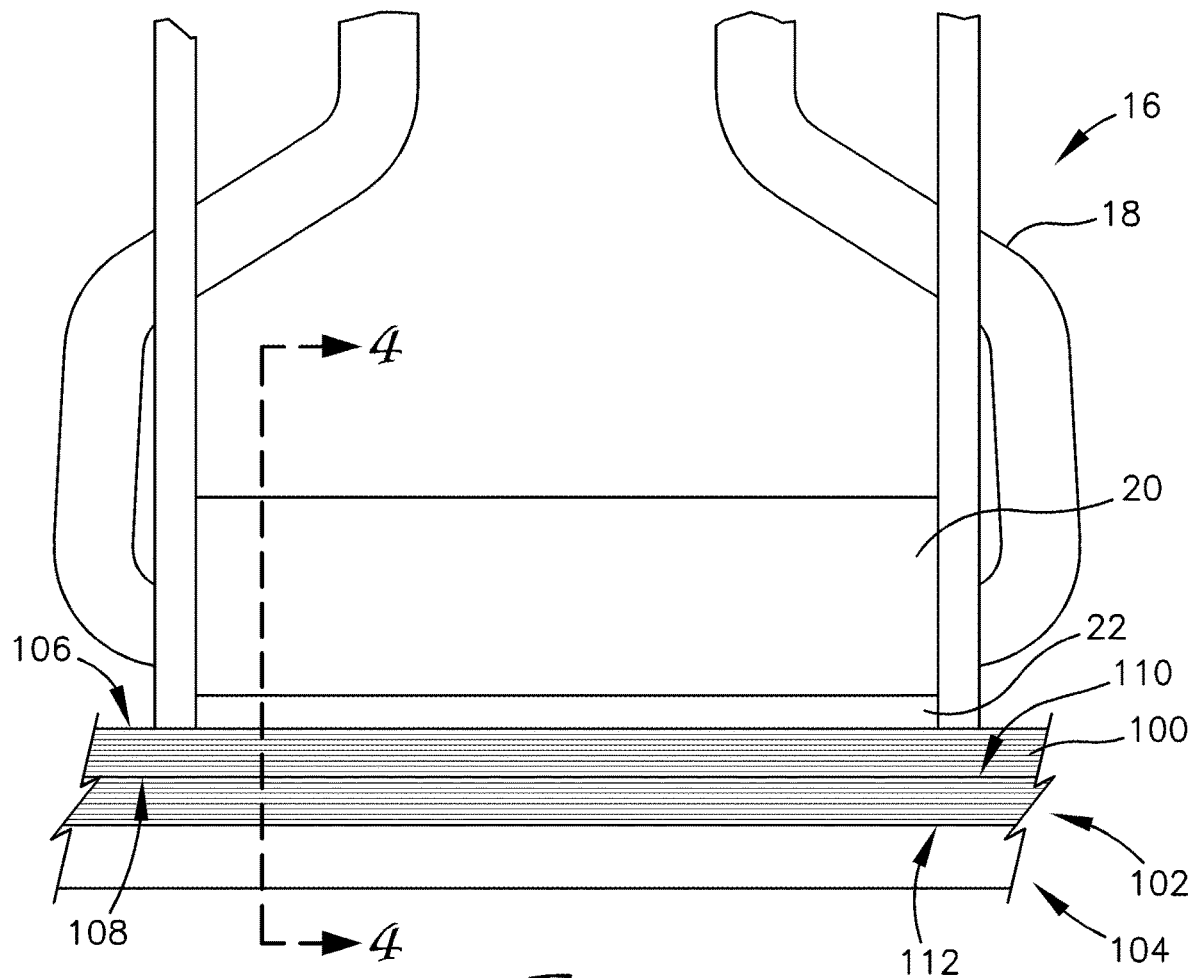
FIG. 3 is a front elevation view of a welding shoe of the welding system of FIG. 1.
Figure 4:
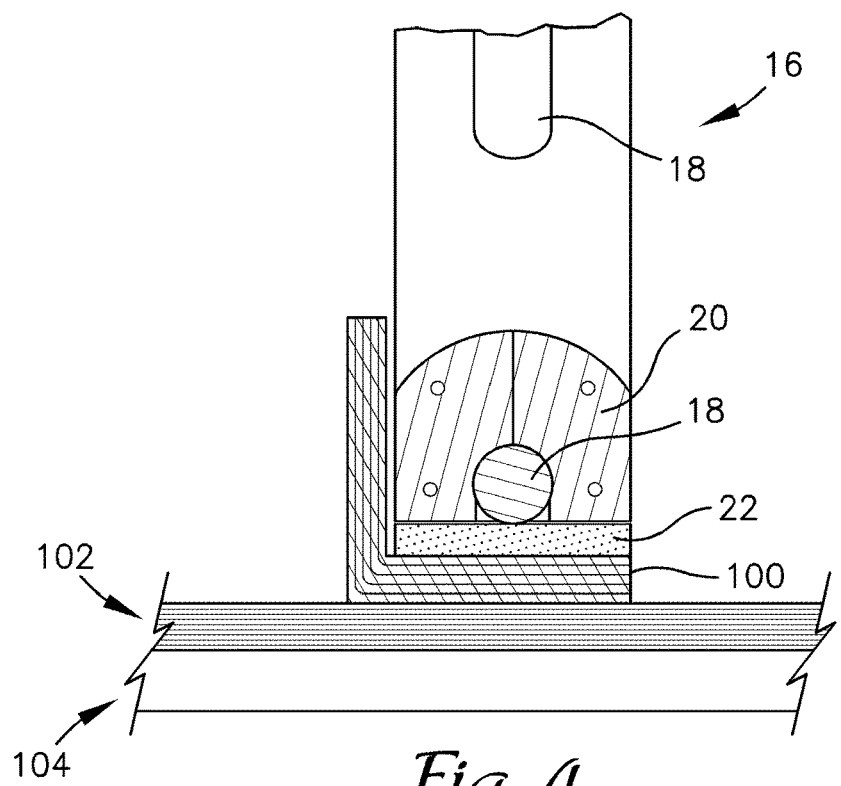
FIG. 4 is a side cross section view of the welding shoe of FIG. 3.
Figure 5:
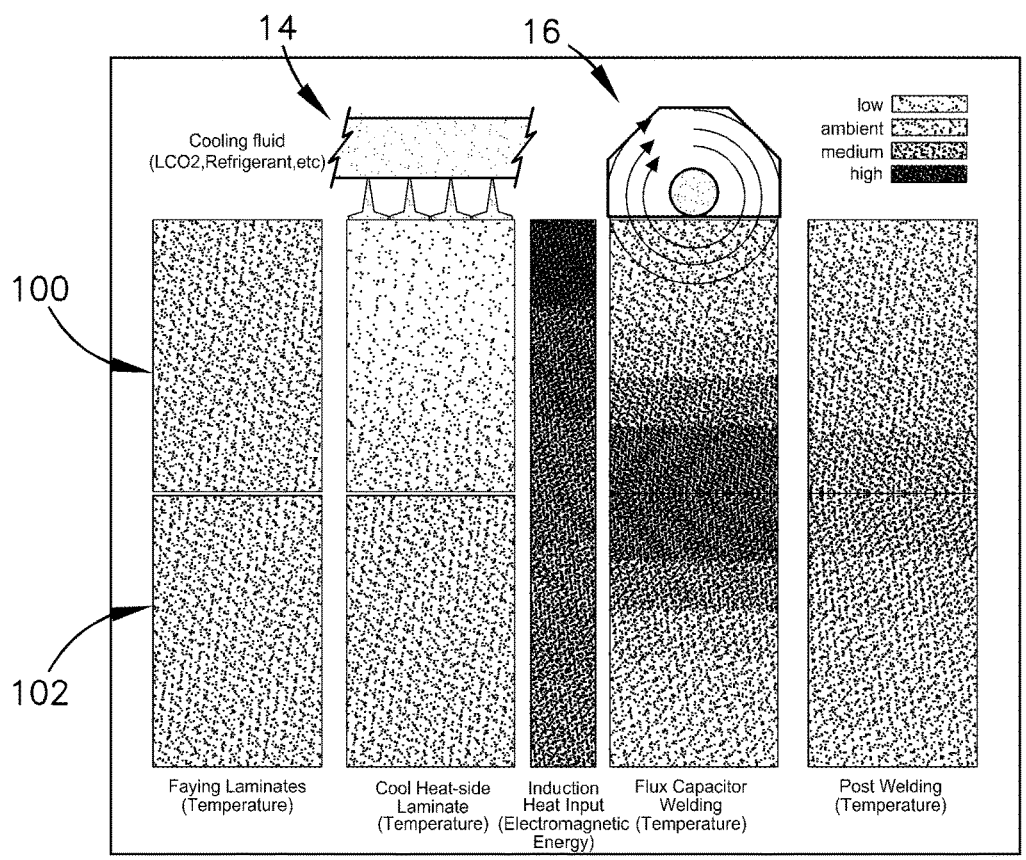
FIG. 5 is a schematic view of a thermal gradient progression in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning to FIGS. 1-4, a thermoplastic composite welding system 10 constructed in accordance with various aspects of the invention for welding a heat-side laminate 100 and an opposing laminate 102 together is illustrated. The thermoplastic composite welding system 10 broadly comprises a frame 12, a cooling element 14, and a welding shoe 16.

The cooling element 14 may comprise a perforated plenum including one or more openings for dispersing cooled fluid to the first side 106 of the heat-side laminate 100. Alternatively, the cooling element 14 may comprise a heat sink configured to be brought into contact with the first side 106 of the heat-side laminate 100 and to draw heat therefrom. The heat sink may in turn be cooled by immersion in a cold fluid, contact with a cold solid, circulation of a cold fluid through internal passages within the heat sink, or by any other suitable means. In some embodiments, the heat sink of the cooling element 14 may be combined with the elastomeric pressure pad (described below) of the welding shoe 16 as a single device. Other cooling means may be used as described below.

The cooling element 14 may remove heat from the first side 106 of the heat-side laminate 100 to cool the heat-side laminate 100 and create a temperature gradient therein. The cooling element may be formed of plastic, aluminum, elastomeric material, or any other suitable material that is sufficiently thermally conductive and that can operate in close proximity to the induction coil (described below) where required without excessive hysteretic or eddy current heating.

The welding shoe 16 may include an induction coil 18, a magnetic flux control material 20, and an elastomeric pressure pad 22. The welding shoe 16 may be attached to the frame 12 or other structural members.

The induction coil 18 includes left and right sides and a magnetic induction region. The left and right sides extend to an electrical power source for passing electrical current through the magnetic induction region. The magnetic induction region is positioned near a bottom end of the welding shoe 16 for passing an alternating magnetic field through the laminates 100, 102.

The elastomeric pressure pad 22 is positioned near a bottom of the welding shoe 16 below the magnetic induction region of the induction coil 18. The elastomeric pressure pad 22 promotes contact between the laminates 100, 102. Specifically, the elastomeric pressure pad 22 promotes compliance to textured or contoured surfaces. In some embodiments, the elastomeric pressure pad 22 may also function as the heat sink of the cooling element 14.

Figure 6:
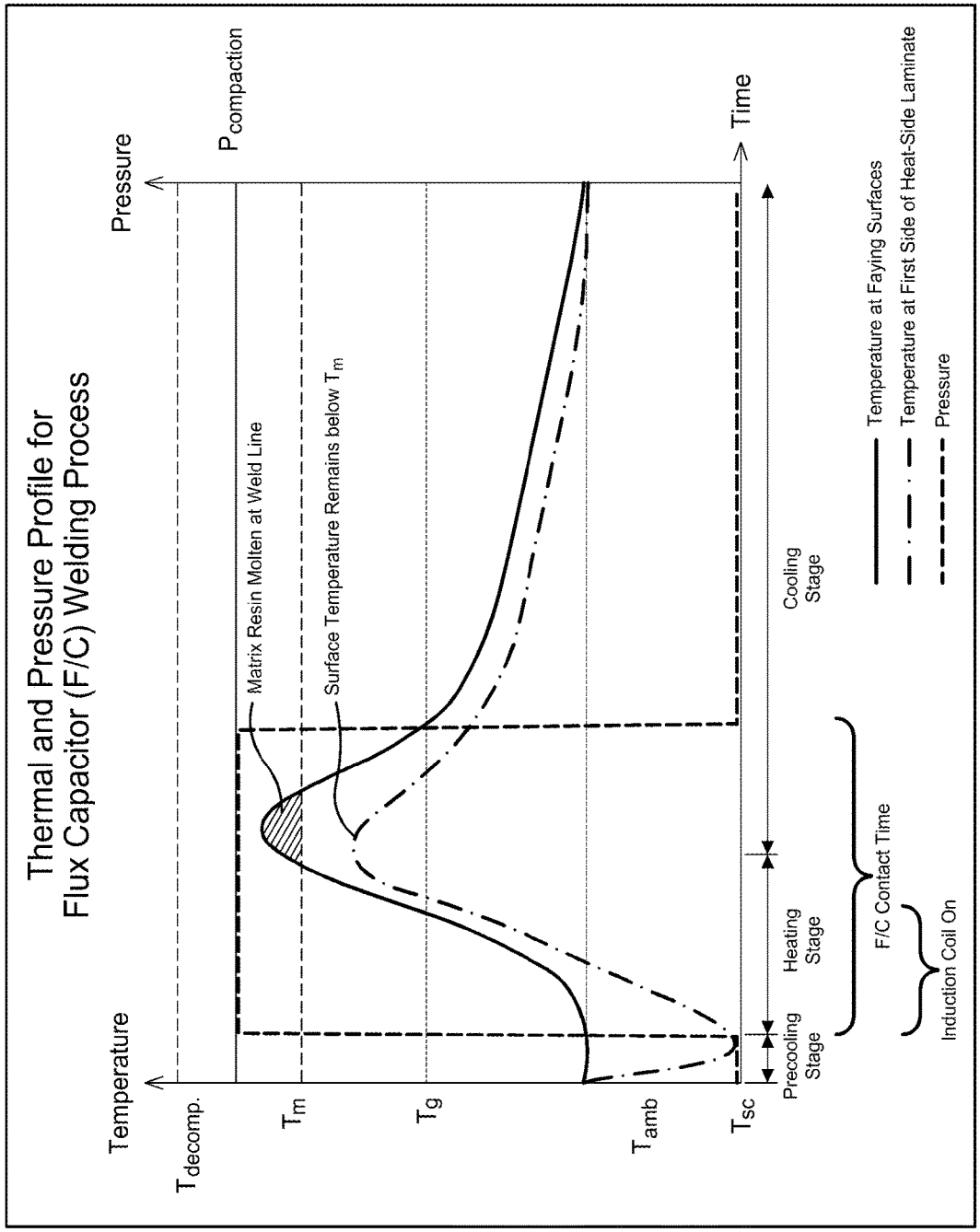
FIG. 6 is a thermal and pressure profile graph in accordance with an embodiment of the invention.
Figure 7:
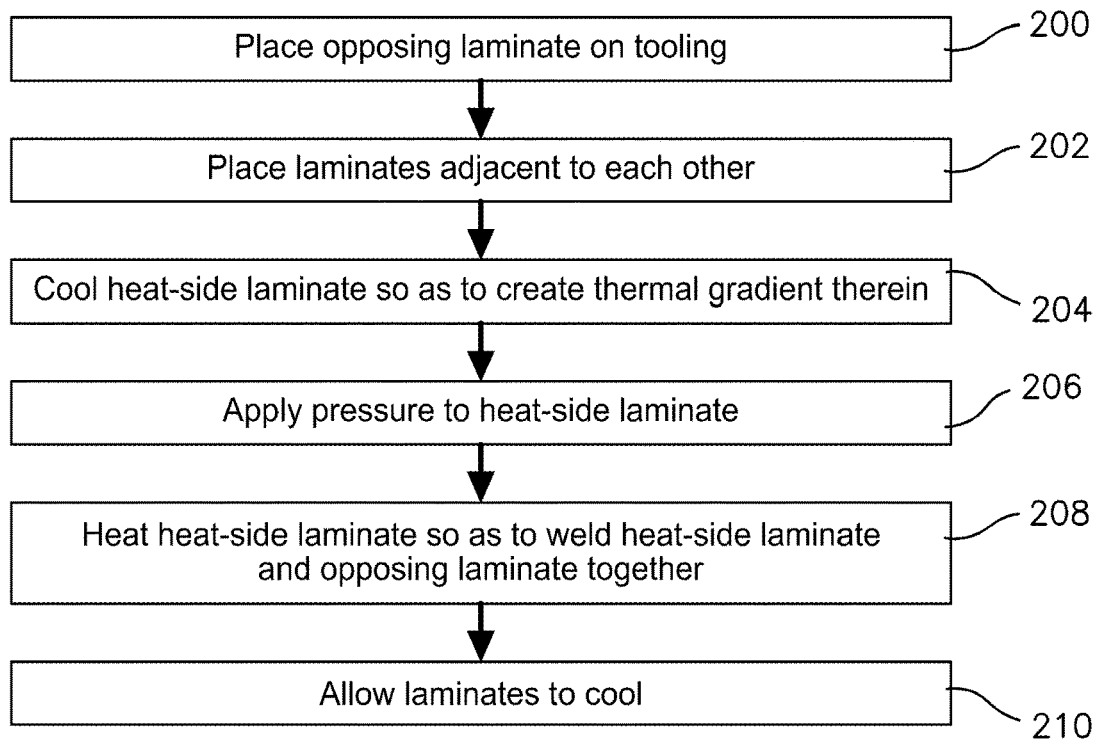
FIG. 7 is a flow diagram depicting certain steps of a method of thermoplastic composite welding in accordance with an embodiment of the invention.

Turning to FIG. 7, and with reference to FIGS. 1-6, a method of thermoplastic composite welding will now be described in detail. First, the opposing laminate 102 may be placed on tooling 104, as shown in block 200. Next, the heat-side laminate 100 may be placed on or adjacent to the opposing laminate 102 (opposite the tooling 104) such that their faying surfaces (e.g., the second side 108 of the heat-side laminate 100 and the first side 110 of the opposing laminate) contact each other, as shown in block 202.

The heat-side laminate 100 may then be cooled in a precooling stage so as to create a thermal gradient therein, as shown in block 204. For example, a cold fluid may be passed through a perforated plenum of the cooling element 14 and dispersed to the first side 106 of the heat-side laminate 100. The cold fluid may then draw heat from the heat-side laminate 100 so as to cool the heat-side laminate 100. The precooling stage may be ended before the temperature through the thickness of the heat-side laminate 100 becomes substantially uniform. Alternatively, the first side 106 of the heat-side laminate 100 may be cooled by other means such as contact with a cold fluid or exposure to a convective cooling jet or cold fluid. As such, the first side 102 of the heat-side laminate 100 may be cooled (to $T_c$) from ambient temperature ($T_{amb}$) whereas the second side 108 of the heat-side laminate 100 and the first and second sides 110, 112 of the opposing laminate 102 may be relatively warmer.

Pressure may then be applied to the heat-side laminate 100 and/or the opposing laminate 102 during a heating stage to a compaction pressure $P_{compaction}$ via the elastomeric pressure pad 22, as shown in block 206. This provides compliance to textures or contours of the second side 108 of the heat-side laminate 100 and the first side 110 of the opposing laminate 102.

The heat-side laminate 100 may also be heated in the heating stage via the welding shoe 16 so as to weld the second side 108 of the heat-side laminate 100 and the first side 110 of the opposing laminate 102 (i.e., the faying surfaces) together, as shown in block 208. Specifically, an electrical current may be passed through the induction coil 18 to generate a high-frequency alternating magnetic field. The high-frequency alternating magnetic field thereby induces eddy current heating in the heat-side laminate 100. The high-frequency alternating magnetic field may be controlled via the flux control material 20 in the welding shoe 16.

In the heating stage, a temperature of the second side 108 of the heat-side laminate 100 and the first side 110 of the opposing laminate 102 at least temporarily surpasses a melt temperature $T_m$ such that matrix resin at those sides is molten. Meanwhile, a temperature of the first side 106 of the heat-side laminate 100, which is closer to the heat source, peaks below a melt temperature $T_m$ due to the earlier-induced thermal gradient.

The induction coil 18 may be turned off during the heating stage to effect a desired maximum temperature of the faying surfaces, as depicted in FIG. 6. The faying surfaces and the first side 106 of the heat-side laminate 100 may then begin to cool to $T_{amb}$ in a cooling stage, as shown in block 210. Meanwhile, pressure may be applied to the laminates 100, 102 via the elastomeric pressure pad 22 during the entire heating stage and into the cooling stage.

Furthermore, the elastomeric pressure pad 22 may be withdrawn in the cooling stage so as to reduce pressure on the laminates 100, 102 to zero, as depicted in FIG. 6. In particular, pressure may be reduced or eliminated when the temperature at the faying surfaces decreases below $T_m$. The laminates 100, 102 continue to cool to $T_{amb}$ in the cooling stage.

The above-described system and method provide several advantages. For example, the induced thermal gradient in the laminates 100, 102 provides a thermal sink before welding such that portions of the heat-side laminate 100 do not melt during welding and such that only regions of the laminates 100, 102 near the faying surfaces reach melt temperature ($T_m$). Heat transfer occurs in advance of welding, thus rendering a heat transfer rate (of the laminates 100, 102 in this case) less important. A variability of heat transfer rate between the laminates 100, 102 and any heat sink or other component positioned near the first side 106 of the heat-side laminate 100 can be overcome by varying a cooling time to achieve a desired surface temperature and thermal gradient. The first side 106 of the heat-side laminate 100 also does not undergo deformation or distortion because the first side 106 stays under the melt temperature $T_m$.

Figure 8:
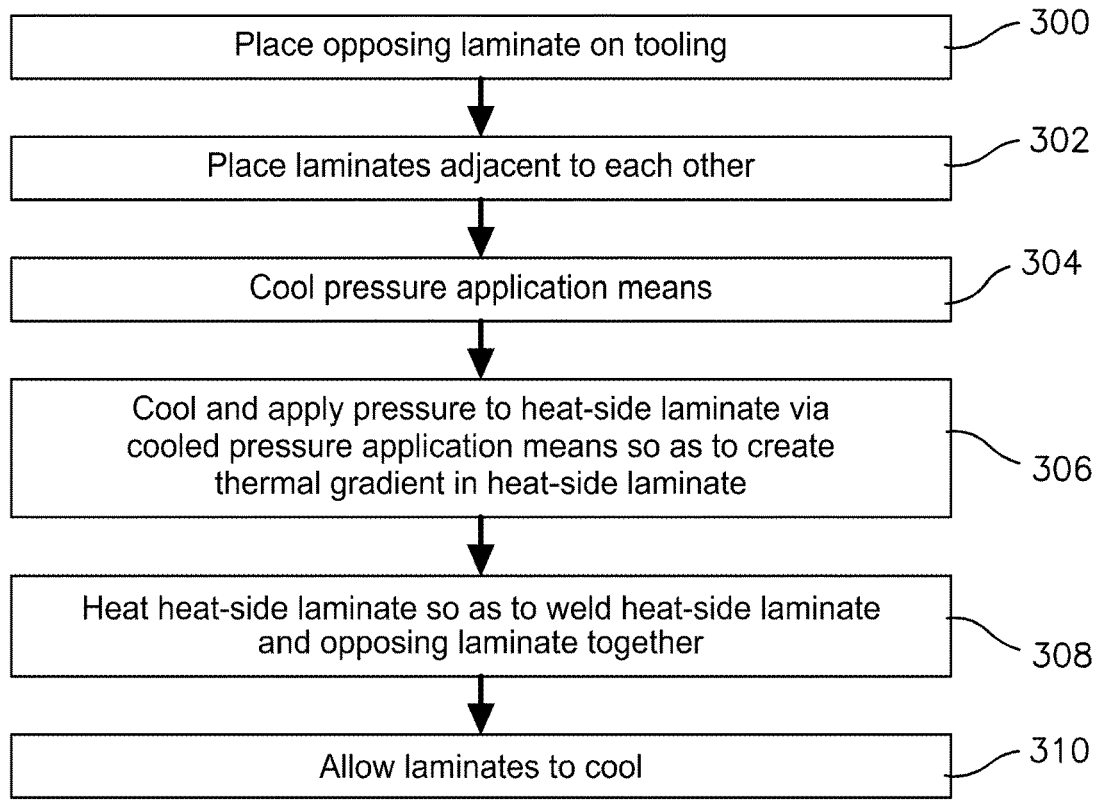
FIG. 8 is a flow diagram depicting certain steps of a method of thermoplastic composite welding in accordance with another embodiment of the invention.
Figure 9:
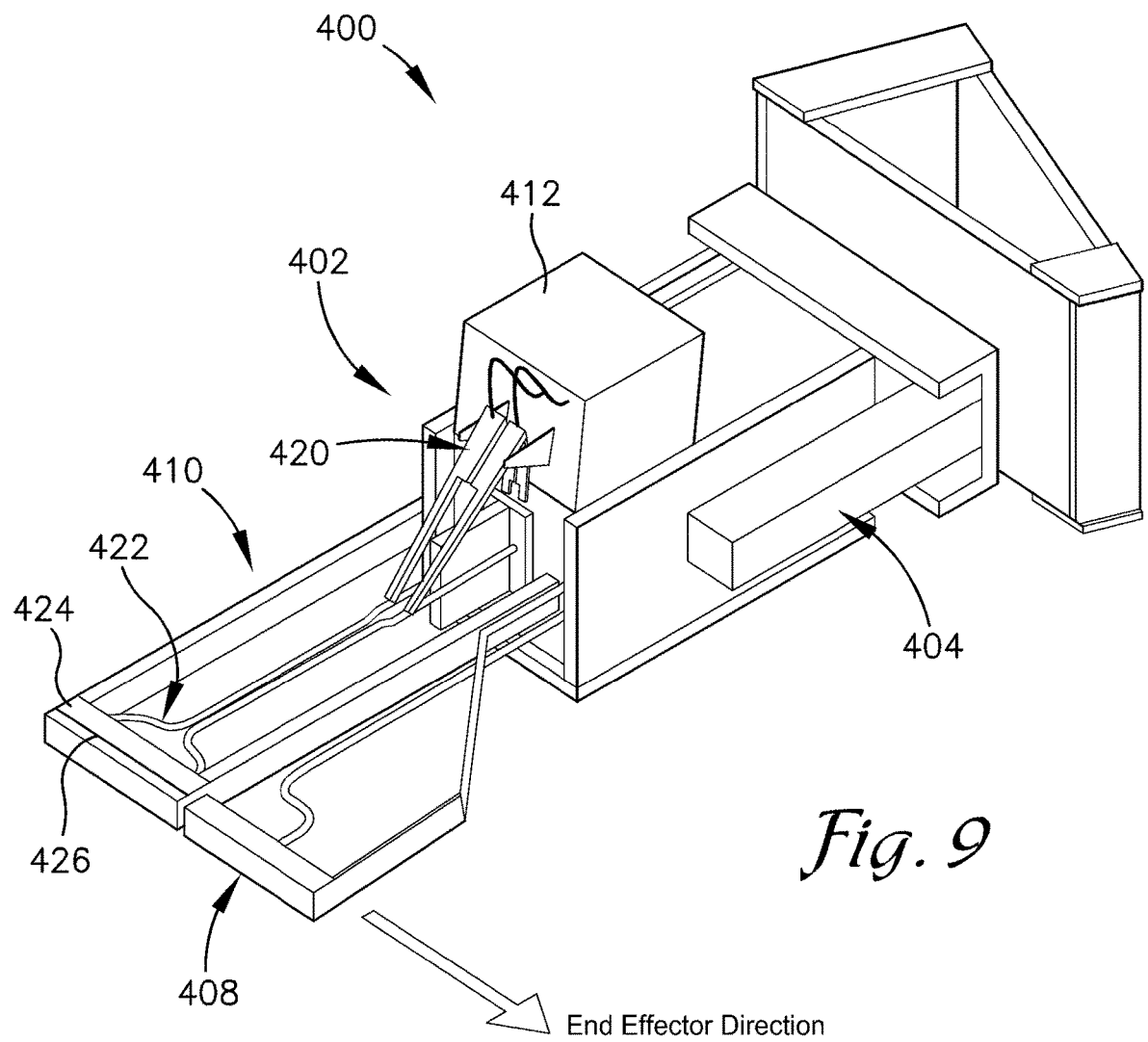
FIG. 9 is a perspective view of a thermoplastic composite welding system constructed in accordance with another embodiment of the invention.
Figure 10:
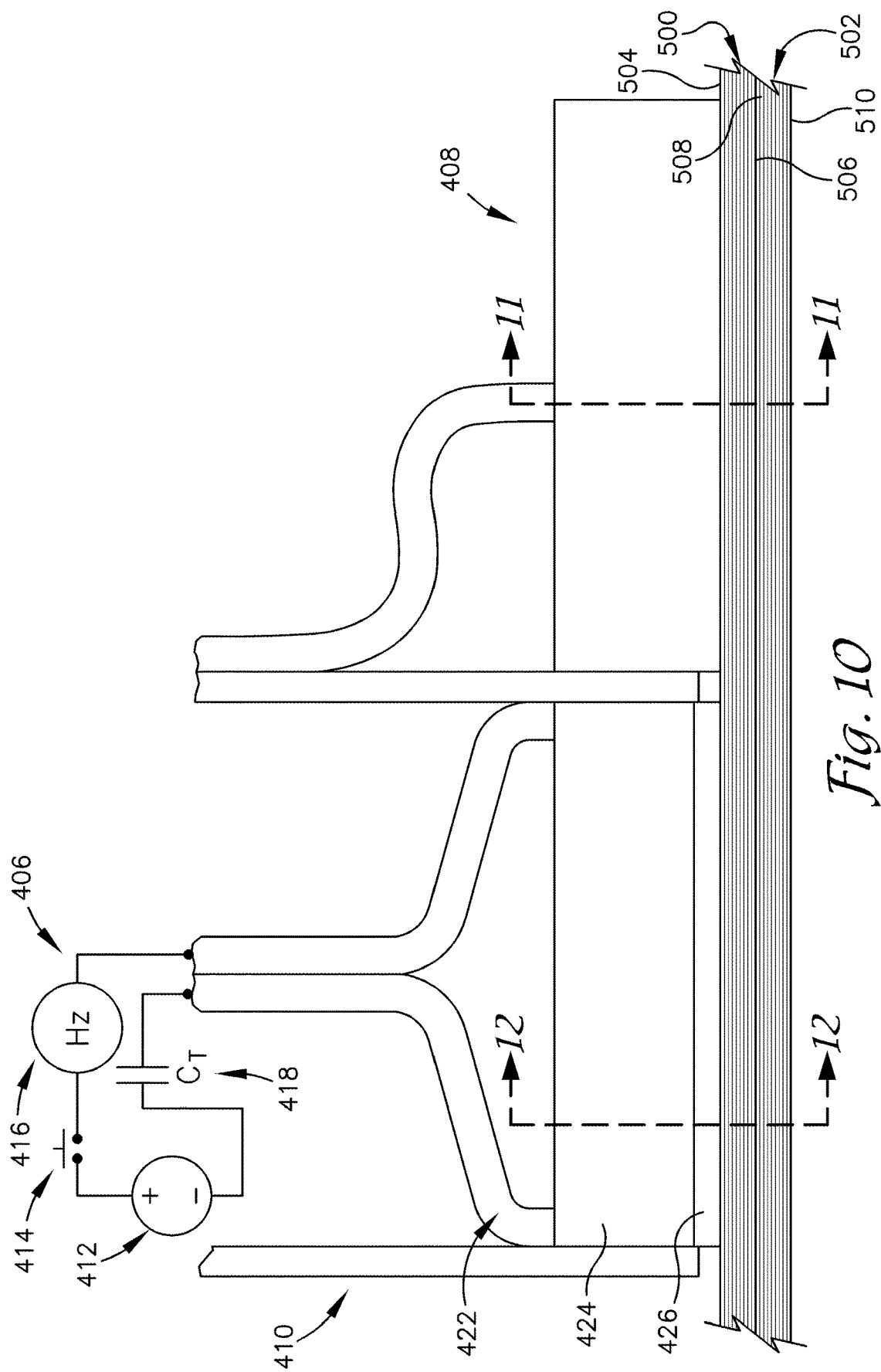
FIG. 10 is a front elevation view of a welding shoe of the welding system of FIG. 9.
Figure 12:
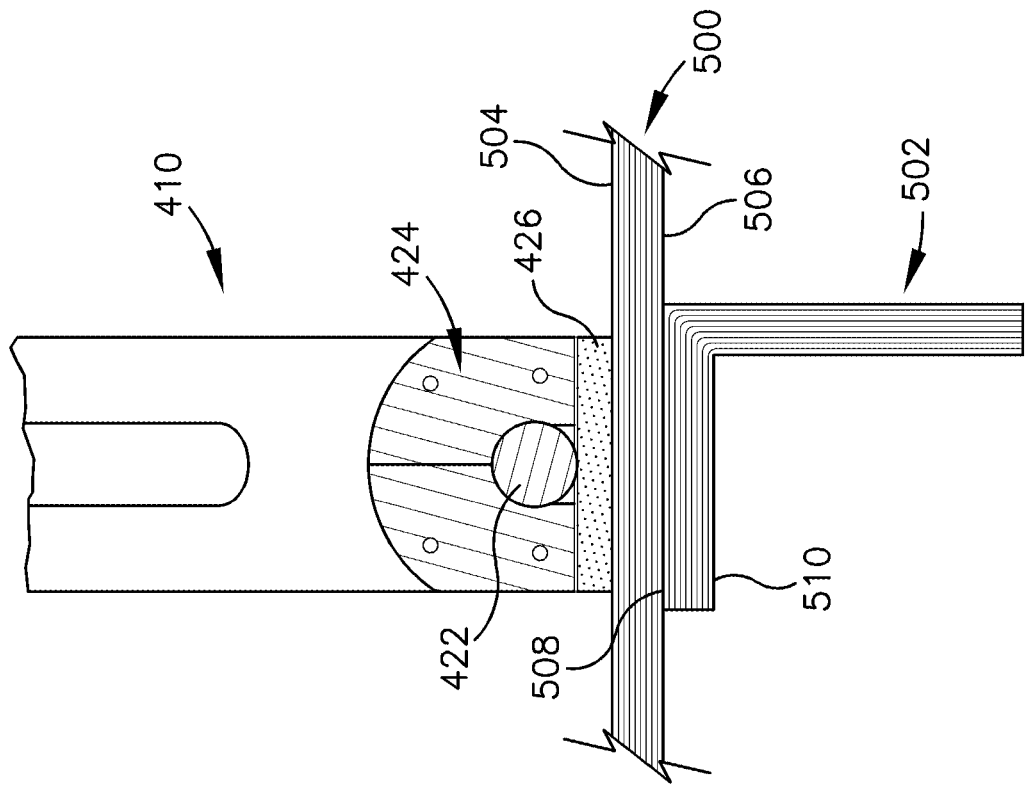
FIG. 12 is a side cross section view of the welding shoe of FIG. 10.
Figure 11:
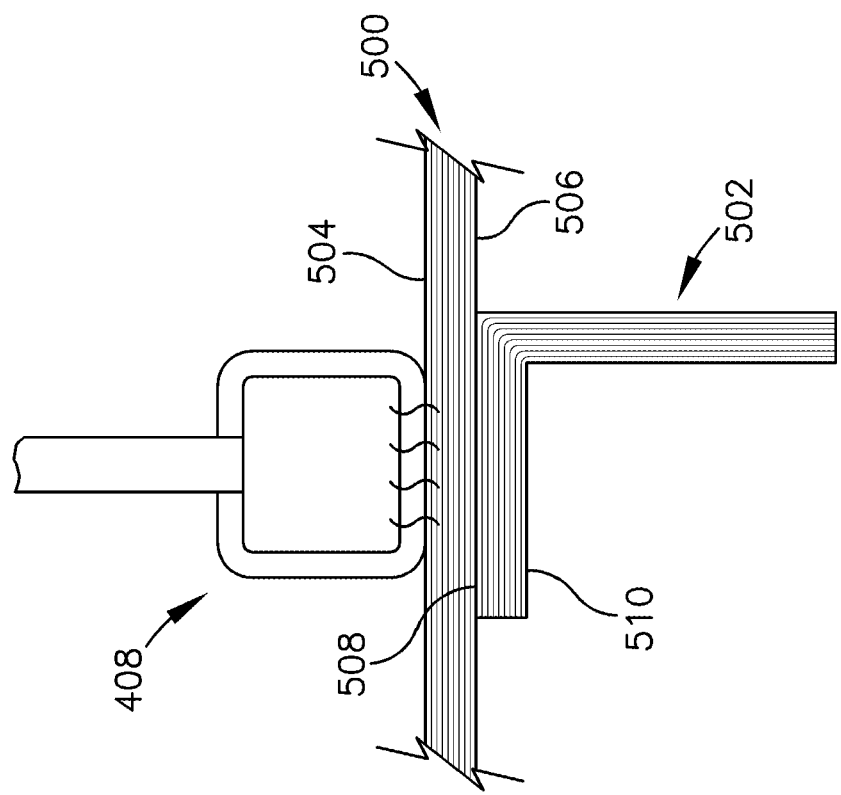
FIG. 11 is a side cross section view of a cooling element of the welding system of FIG. 9.

Turning to FIG. 8, another method of thermoplastic composite welding will now be described in detail. First, the opposing laminate 102 may be placed on the tooling 104, as shown in block 300. Next, the heat-side laminate 100 may be placed on or adjacent to the opposing laminate 102 (opposite the tooling 104) such that their faying surfaces (e.g., the second side 108 of the heat-side laminate 100 and the first side 110 of the opposing laminate) contact each other, as shown in block 302.

The elastomeric pressure pad 22, serving as the heat sink of the cooling element 14, may then be cooled, as shown in block 304. For example, the elastomeric pressure pad 22 may be introduced to a cool environment, material, or device such as dry ice, liquid nitrogen, a refrigeration cycle, or the like. This reduces the temperature of the elastomeric pressure pad 22.

The heat-side laminate 100 may then be cooled in a precooling stage so as to create a thermal gradient therein, as shown in block 306. Specifically, the elastomeric pressure pad 22 may be positioned adjacent to the first side 106 of the heat-side laminate 100 so as to cool the heat-side laminate 100 and create a thermal gradient therein. The first side 106 of the heat-side laminate 100 may be cooled (to $T_c$) from ambient temperature ($T_{amb}$) whereas the second side 108 and the first and second sides 110, 112 of the opposing laminate 102 may be relatively warmer. Pressure may also be applied to the heat-side laminate 100 and/or opposing laminate 102 via the elastomeric pressure pad 22.

The heat-side laminate 100 may then be heated in a heating stage via the welding shoe 16 so as to weld the second side 108 of the heat-side laminate 100 and the first side 110 of the opposing laminate 102 together, as shown in block 308. Specifically, an electrical current may be passed through the induction coil 18 to generate a high-frequency alternating magnetic field. The high-frequency alternating magnetic field thereby induces eddy current heating in the heat-side laminate 100. The high-frequency alternating magnetic field may be controlled via the flux control material 20 above the elastomeric pressure pad 22.

In the heating stage, a temperature of the second side 108 of the heat-side laminate 100 and the first side 110 of the opposing laminate 102 at least temporarily surpasses a melt temperature $T_m$ such that matrix resin at those sides is molten, as depicted in FIG. 6. Meanwhile, a temperature of the first side 106 of the heat-side laminate 100 peaks below the melt temperature $T_m$ due to the earlier-induced thermal gradient.

The faying surfaces and the first side 106 of the heat-side laminate 100 may then begin to cool to $T_{amb}$ in a cooling stage, as shown in block 310. The elastomeric pressure pad 22 may be withdrawn in the cooling stage so as to reduce pressure on the laminates 100, 102 to zero, as depicted in FIG. 6. In particular, pressure may be reduced or eliminated when the temperature at the faying surfaces decreases below $T_m$. The laminates 100, 102 continue to cool to $T_{amb}$ in the cooling stage which may occur more slowly due to the removal of the cool elastomeric pressure pad 22 allowing additional time above $T_g$ for substantial crystallinity to grow.

Turning to FIGS. 9-15, a thermoplastic composite welding system 400 constructed in accordance with various aspects of the invention for welding a heat-side laminate 500 (e.g., a skin laminate) and an opposing laminate 502 (e.g., a stiffener laminate) together is illustrated. The thermoplastic composite welding system 400 broadly comprises a frame 402, a force applicator 404, test circuitry 406, a cooling element 408, a primary power supply, and a welding shoe 410.

The frame 402 is configured to support the force applicator 404, test power supply (described below), cooling element 408, and welding shoe 410. The frame 402 may be a robotic arm, an actuator, a linkage system, or the like. The frame 402 may be manually or automatically controlled.

The force applicator 404 is configured to urge the welding shoe 410 against the heat-side laminate 500 and may be a hydraulic, pneumatic, mechanical, or electromagnetic system. In one embodiment, the force applicator 404 includes force application cylinders in drivable engagement with force application pistons connected to the welding shoe 410.

The test circuitry 406 includes a secondary power supply 412, a switch 414, frequency generator 416, and a capacitor 418. The test circuitry 406 is configured to be selectively connected to the welding shoe 410 via an actuated shunt 420 for inducing a test magnetic field in the heat-side laminate 500 and opposing laminate 502. The actuated shunt is configured to reversibly disconnect the induction coil (described below) from the primary power supply and connect the induction coil to the test circuitry 406. Alternatively, a dedicated testing coil may be used, in which case the actuated shunt 420 may be omitted.

The secondary power supply 412 may be a battery, an external power supply, a capacitor, or the like. The secondary power supply may be a DC or AC power supply.

The switch 414 closes the test circuitry 406 to generate an electrical signal for inducing the test magnetic field. In some embodiments the switch 414 may be omitted.

The frequency generator 416 creates a resonance in the electrical signal. In some embodiments, a dedicated frequency generator may be omitted (for example, if AC current is used).

The capacitor 418 may be connected between the welding shoe and the secondary power supply 412 and generates capacitive reactance in the test circuitry 406. A value of the capacitive reactance may depend on impedance in the welding shoe 410 according to conditions of the heat-side laminate 500 and opposing laminate 502, as discussed in more detail below.

The cooling element 408 may comprise a perforated plenum including openings for dispersing cooled fluid to a first side 504 of the heat-side laminate 500. Alternatively, the cooling element 408 may comprise a heat sink configured to be brought into contact with the first side 504 of the heat-side laminate 500 and to draw heat therefrom. The heat sink may in turn be cooled by immersion in a cold fluid, contact with a cold solid, circulation of a cold fluid through internal passages within the heat sink, or by any other suitable means. In some embodiments, the heat sink of the cooling element 408 may be combined with the elastomeric pressure pad (described below) of the welding shoe 410 as a single device.

The cooling element 408 may be configured to remove heat from the first side 504 of the heat-side laminate 500 to cool the heat-side laminate 500 and create a temperature gradient therein. The cooling element 408 may be formed of plastic, aluminum, elastomeric material, or any other suitable material that is sufficiently thermally conductive and that can operate in close proximity to the induction coil (described below) where required without excessive hysteretic or eddy current heating.

The primary power supply provides high amperage alternating current to the induction coil of the welding shoe 410. The primary power supply may be a battery, a superconductor, an external power supply, or the like. The primary power supply may be selectively disconnected from the induction coil via the actuated shunt 420.

The welding shoe 410 may include an induction coil 422, a magnetic flux control material 424, and an elastomeric pressure pad 426. The welding shoe 410 may be attached to the frame 402 or other structural members and may be configured to be moved into a welding position via a robot arm, actuator, mechanical linkage, or the like.

The induction coil 422 includes left and right legs and a magnetic induction region. The left and right legs connect to the primary power supply for passing electrical current through the magnetic induction region. The magnetic induction region is positioned near a bottom end of the welding shoe 410 for creating an alternating magnetic field in the heat-side laminate 500 and the opposing laminate 502.

The elastomeric pressure pad 426 is positioned near a bottom of the welding shoe 410 below the magnetic induction region of the induction coil 422. The elastomeric pressure pad 426 distributes a force from the force applicator 404 as pressure to the heat-side laminate 500. The elastomeric pressure pad 426 may also promote contact between the heat-side laminate 500 and the opposing laminate 502. That is, the elastomeric pressure pad 426 may promote compliance to textured or contoured surfaces. In some embodiments, the elastomeric pressure pad 426 may also function as the heat sink of the cooling element 408. In some embodiments the pressure pad may be composed of a compliant material other than an elastomer such as felt, fleece or fabric.

Figure 15:
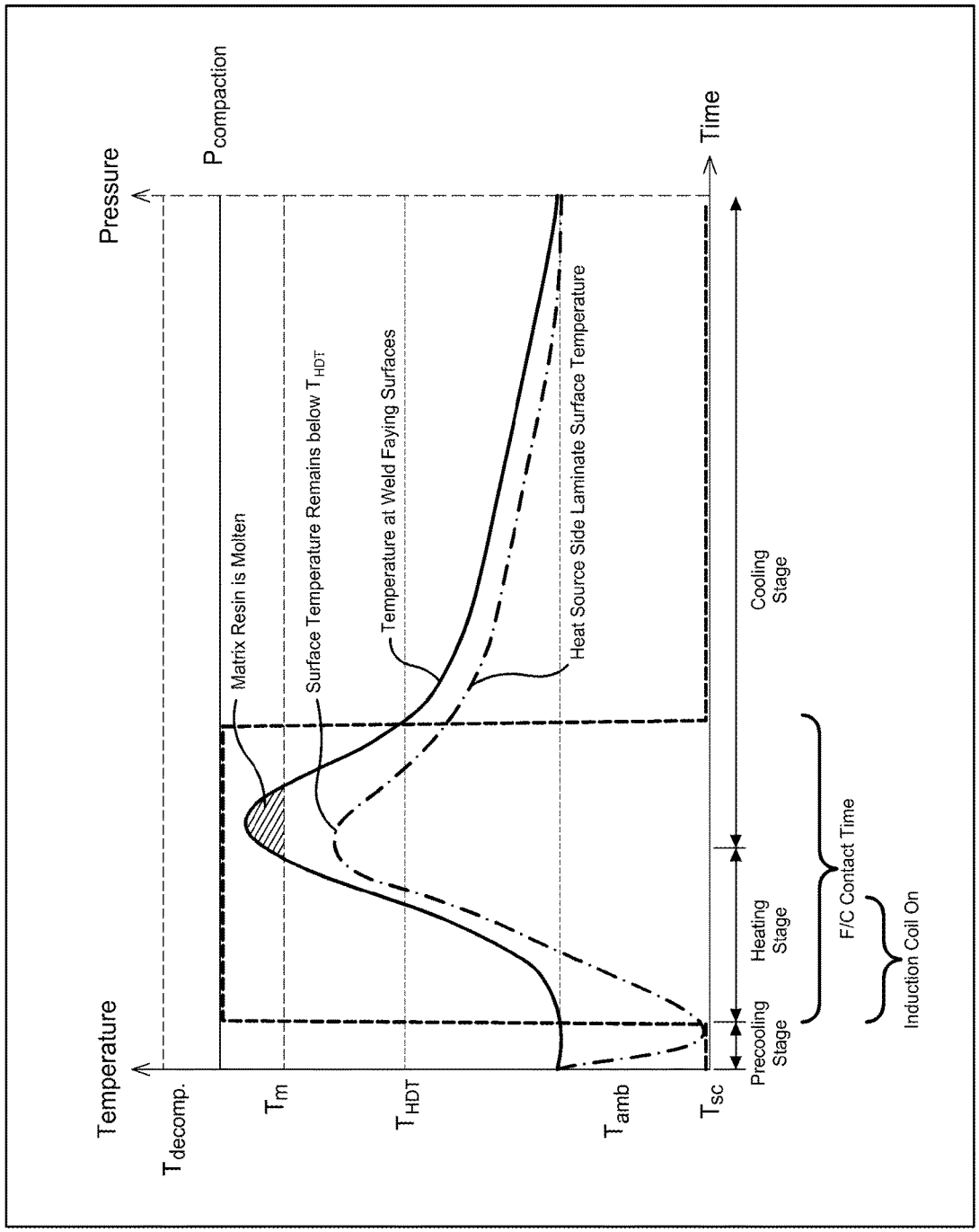
FIG. 15 is a thermal and pressure profile graph in accordance with an embodiment of the invention.
Figure 16:
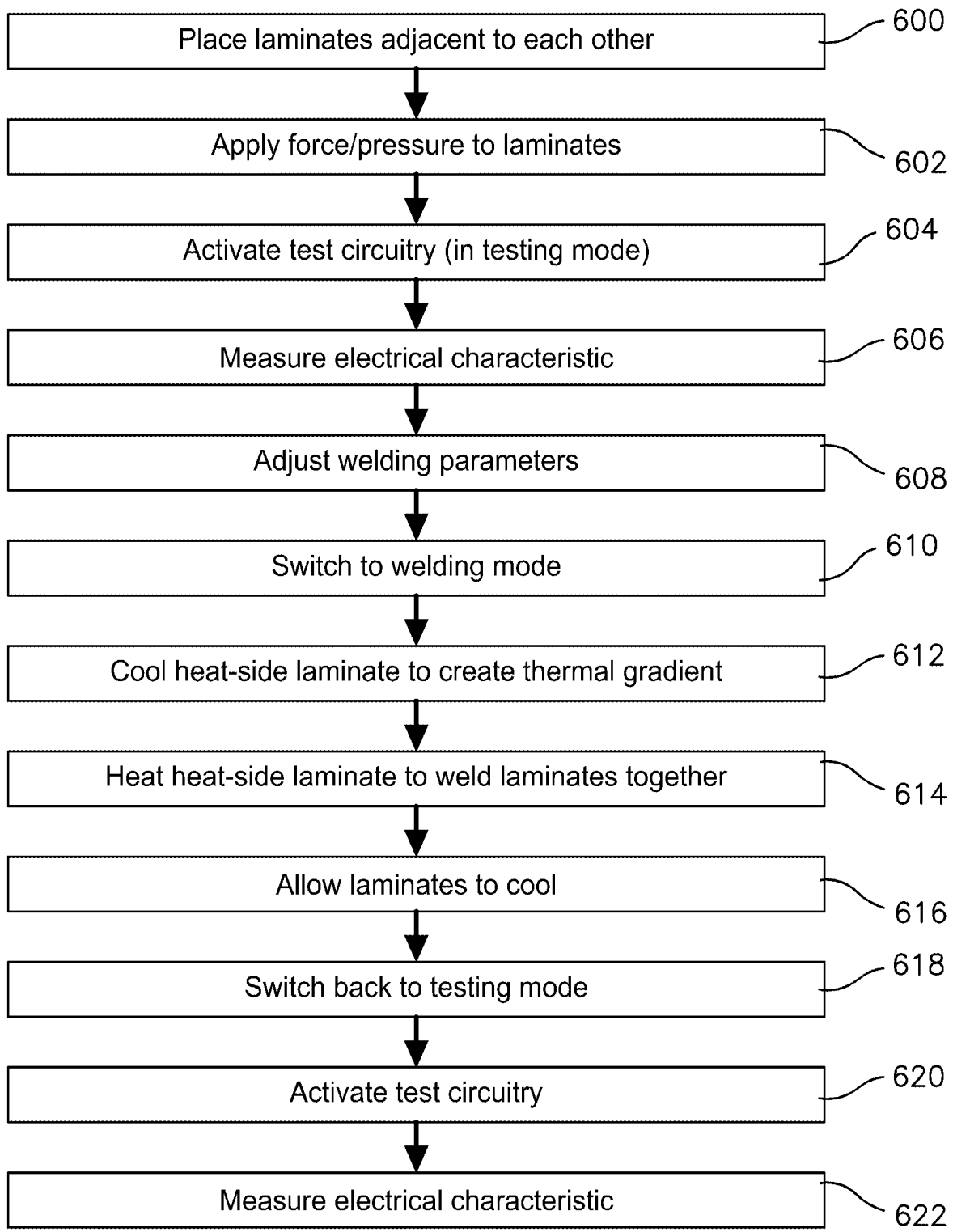
FIG. 16 is a flow diagram depicting certain steps of a method of thermoplastic composite welding in accordance with an embodiment of the invention.

Turning to FIG. 16 and with reference to FIGS. 9-15, a method of thermoplastic welding will now be described in detail. First, the heat-side laminate 500 may be placed on or adjacent the opposing laminate 502 such that their faying surfaces (e.g., the second side 506 of the heat-side laminate 500 and the first side 508 of the opposing laminate 502) contact each other, as shown in block 600. The opposing laminate 502 may be inaccessible after the heat-side laminate 500 is placed adjacent to the opposing laminate 502.

The force applicator 404 may then be activated to apply a clamping force to the heat-side laminate 500 against the opposing laminate 502 with the welding shoe 410 being positioned adjacent the heat-side laminate 500, as shown in block 602. The clamping force may be distributed as pressure via the elastomeric pressure pad 426. The pressure should be substantially the same for testing steps and welding steps so that electrical influence exhibited during welding is replicated during testing.

The test circuitry 406 may then be activated to test electrical characteristics/properties of the heat-side laminate 500 and/or opposing laminate 502, as shown in block 604. Specifically, the secondary power supply 412 together with the frequency generator 416 and capacitor 418 may generate a test signal in the induction coil 422 or the dedicated testing coil. The test signal may be a momentary current or any other suitable waveform.

Conductivity, resistivity, impedance, natural frequency, reactance, magnetic field signature, or other electrical characteristics of the heat-side laminate 500 and/or opposing laminate 502 may then be measured, as shown in block 606. This measurement may be compared to a free space test value or other baseline test value.

Welding parameters of the thermoplastic composite welding system 400 may then be adjusted or selected according to the measurement, as shown in block 608. For example, a power level of the primary power supply, spacing of the induction coil 422 from the heat-side laminate 500, a force magnitude of the force applicator 404, welding timing, cooling gradient, and other parameters may be adjusted or selected according to the measurement. This step may include looking up welding parameter values corresponding to measurement values in a lookup table.

The shunt 420 may then be activated to switch the thermoplastic composite welding system 400 from the test circuitry 406 to the primary power supply for welding, as shown in block 610. Alternatively, the above testing steps may be performed without testing circuitry (i.e., via the primary power supply and integrated welding circuitry) or via the dedicated testing coil. In this case, the shunt 420 and shunt activation step may be omitted.

The heat-side laminate 500 may then be cooled in a precooling stage so as to create a thermal gradient therein, as shown in block 612 and FIG. 15. For example, a cold fluid may be passed through the perforated plenum of the cooling element 408 and dispersed to the first side 504 of the heat-side laminate 500 to draw heat therefrom. In this way, the first side 504 of the heat-side laminate 500 may be cooled to $T_c$ from ambient temperature $T_{amb}$ whereas the second side 506 of the heat-side laminate 500 and the first and second sides 508, 510 of the opposing laminate 502 may be relatively warmer. The cooling step may be performed before pre-weld testing so that a thermal gradient is present during pre-weld testing.

The second side 506 of the heat-side laminate 500 may then be welded to the first side 508 of the opposing laminate 502 in a heating stage, as shown in block 614 and FIG. 15. Specifically, the primary power supply may provide an electrical current to the induction coil 422 to generate a magnetic field. The magnetic field induces eddy current heating in the heat-side laminate 500 and opposing laminate 502. The magnetic field may be controlled via the flux control material 424 in the welding shoe 410.

During welding, a temperature of the second side 506 of the heat-side laminate 500 and the first side 508 of the opposing laminate 502 at least temporarily surpasses a melt temperature $T_m$ such that matrix resin at those sides is molten. Meanwhile, a temperature of the first side 504 of the heat-side laminate 500, which is closer to the source of heat, peaks below a melt temperature $T_m$ due to the earlier-induced thermal gradient. Additional thermal gradient optimization may be achieved according to the method discussed below.

The induction coil 422 may then be turned off to effect a desired maximum temperature of the faying surfaces. The faying surfaces and the first side 504 of the heat-side laminate 500 may then begin to cool to $T_{amb}$ in a cooling stage, as shown in block 616. Meanwhile, pressure may be applied to the laminates 500, 502 via the elastomeric pressure pad 426 during the entire heating stage and into the post-weld cooling stage.

The shunt 420 may then be activated to switch the thermoplastic composite welding system 400 from the primary power supply to the test circuitry 406 for post-weld testing, as shown in block 618. Alternatively, post-weld testing may be performed without testing circuitry (i.e., via the primary power supply and integrated welding circuitry). In this case, the shunt 420 and shunt activation step may be omitted.

The test circuitry 406 may then be activated to test electrical influence of the welded heat-side laminate 500 and opposing laminate 502, as shown in block 620. Specifically, the secondary power supply 412 together with the frequency generator 416 and capacitor 418 may generate a test signal in the induction coil 422. The test signal may be a momentary current or any other suitable waveform.

Conductivity, resistivity, impedance, natural frequency, reactance, magnetic field signature, or other electrical characteristics of the welded heat-side laminate 500 and/or opposing laminate 502 may then be measured, as shown in block 622. This measurement may be compared to a free space test value or other baseline test value. This post-weld test may be used to determine a quality or integrity of the weld or to inform better correspondences between welding parameter values and pre-weld measurement values for future welds. To that end, this measurement may be compared to a database of expected electrical characteristic values that indicate a good weld as part of an initial NDI evaluation.

Some or all of the above steps may be repeated for individual welds. Importantly, the thermoplastic welding system 400 may be reconfigured, and welding steps may be tailored, for each weld to accommodate differences in part geometry, laminate structure, material and layup quality, and the like. Unsatisfactory welds (based on the post-weld measurement) may be redone.

The above-described method provides several advantages. For example, in-situ electrical characteristic measuring prior to welding and adjusting or selecting welding parameters based on measured characteristics enables compensation for local material or joint variations for each weld that might otherwise adversely affect weld strength or consistency. In-situ electrical characteristic measuring post welding enables weld qualification and informs better correspondences between welding parameter values and pre-weld measurement values for future welds.

This method is made possible at least in part by the fact that conductive-composite laminates comprised of carbon fiber have bulk conductivity values that can be altered by the level of applied pressure during consolidation, which changes the degree of fiber intimacy. This in turn has an impact on the rate of heating the laminate shows during welding. Applicant has found that the conductivity or other electrical characteristics of the laminates can be measured in situ, and measured values can be compared to an archive of pre-measured values to determine the optimum heating parameters to apply by the induction coil during welding. After welding, that same characterization can be performed on the welded area as or after it cools down. Bulk conductivity of the laminates may be different than before the weld given that the two laminates will have fused into a singular laminate.

The same induction coil 422 may be used for both the sensing/testing and welding steps, or a Litz wire coil could be included in the welding shoe 410 in parallel with or coaxial to the induction coil 422 to sense electrical characteristics. Litz wire is a multi-strand, low resistance wire that can carry alternating current while reducing skin effect and proximity effect losses.

Figure 17:
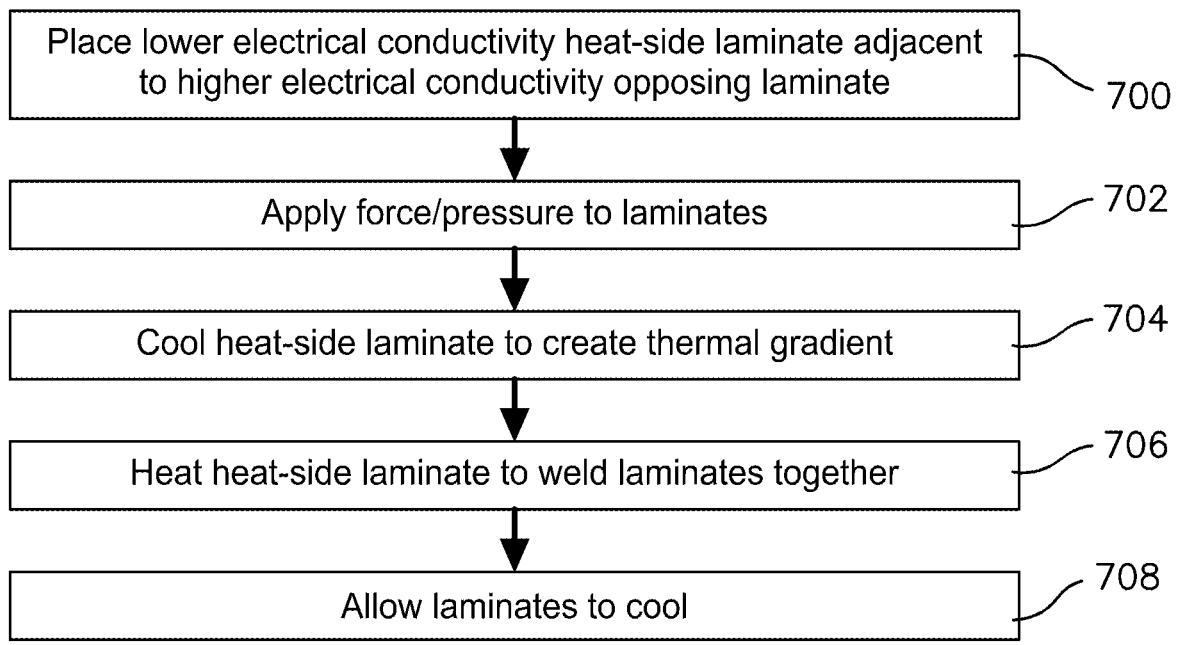
FIG. 17 is a flow diagram depicting certain steps of a method of thermoplastic composite welding in accordance with another embodiment of the invention.

Turning to FIG. 17 and with reference to FIGS. 9-15, another method of thermoplastic welding will now be described in detail. First, the heat-side laminate 500 may be placed on or adjacent the opposing laminate 502 such that their faying surfaces (e.g., the second side 506 of the heat-side laminate 500 and the first side 508 of the opposing laminate 502) contact each other, as shown in block 700. The opposing laminate 502 may be inaccessible after the heat-side laminate 500 is placed adjacent to the opposing laminate 502.

Applicant has discovered that laminates prepared at different pressures have different electrical conductivities so that the laminates heat differently when subjected to the same magnetic conditions. This may be caused by differences in fiber distribution since sectioning and non-destructive inspection (NDI) techniques do not indicate porosity or significant differences in consolidated ply thicknesses. Diminishing magnetic intensity can thereby be compensated for by placing a laminate having lower electrical conductivity closer to the induction coil and a laminate having higher electrical conductivity farther from the induction coil without introducing insulators or other materials that affect weld quality or laminate consistency. In addition, a stand-off distance may be introduced between the laminates and the induction coil to move the laminates into a relatively more dispersed and less intense magnetic field region.

The heat-side laminate 500 may have been prepared at a first consolidation pressure so as to have a first electrical conductivity and the opposing laminate 502 may have been prepared at a second consolidation pressure higher than the first consolidation pressure so as to have a second electrical conductivity higher (and in one embodiment, at least an order of magnitude higher) than the first electrical conductivity. Consolidation pressures may be achieved via autoclave, stamp forming, or vacuum bag. Different consolidation pressures may be achieved by virtue of using different consolidation techniques (e.g., vacuum bag versus autoclave) or by using different pressures via the same consolidation technique (e.g., low pressure autoclave versus higher pressure autoclave). As another example, the heat-side laminate 500 may be a vacuum bag only (VBO) panel while the opposing laminate 502 may be a press consolidated laminate. In one embodiment, the first electrical conductivity may be on the order of approximately 0.65 kS/m, while the second electrical conductivity may be on the order of approximately 11.0 kS/m. This difference in electrical conductivity, and in one embodiment at least one order of magnitude difference in electrical conductivity, between otherwise similar laminates helps achieve melt temperature at the faying surfaces without suffering heat-side laminate deconsolidation or far side laminate deconsolidation (i.e., at least portions of the laminates remain sufficiently rigid during heating). Note that these electrical conductivities are nominal or inherent electrical characteristics of the materials. Welding conditions, part geometries, and other factors may change electrical conductance as measured (see previously described method). Furthermore, equivalent properties such as resistivity may be discussed or claimed without further explanation of the relation between such properties (e.g., a higher conductivity being equivalent to a lower resistivity).

Figure 13:
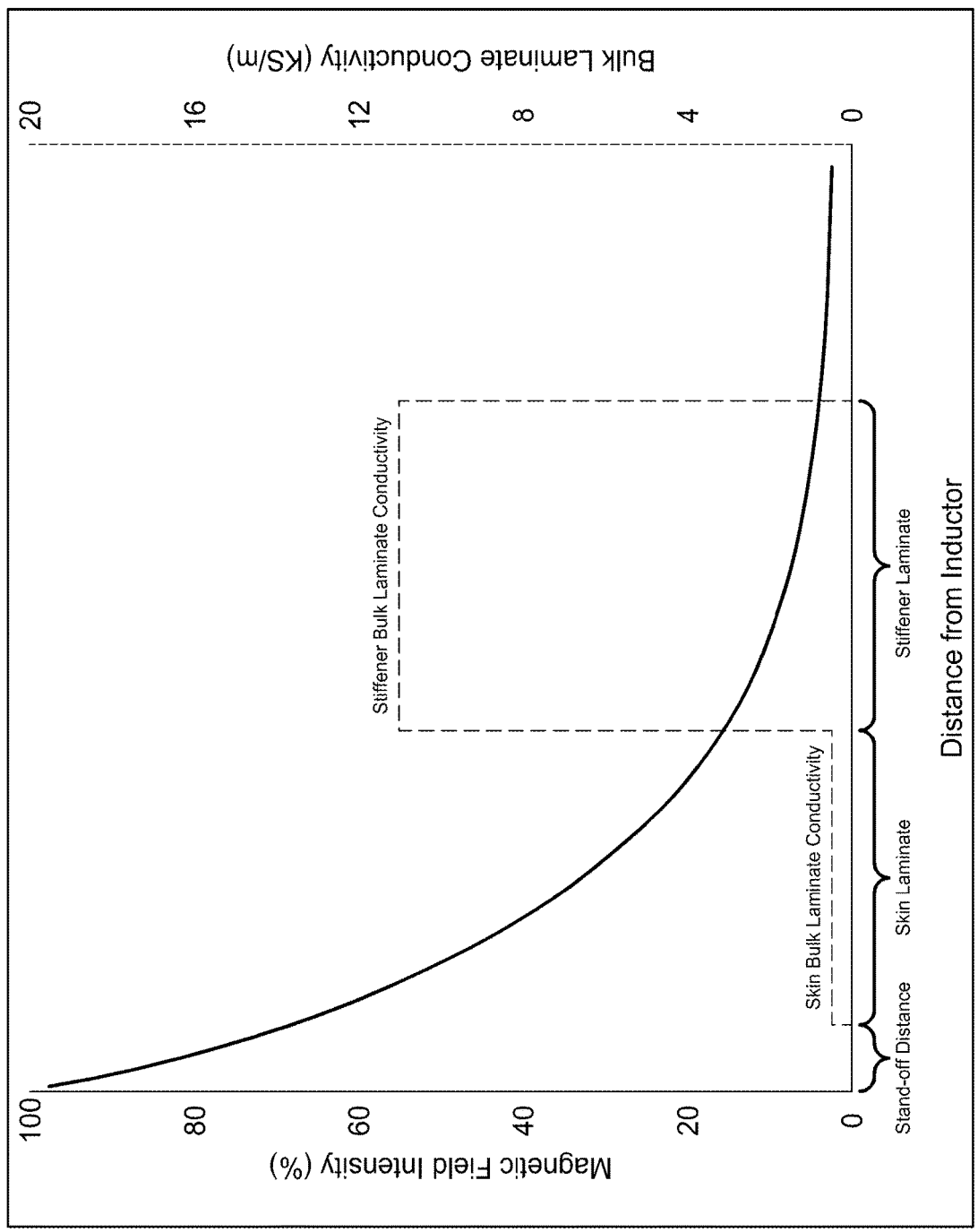
FIG. 13 is a magnetic field intensity and laminate conductivity graph in accordance with an embodiment of the invention.
Figure 14:
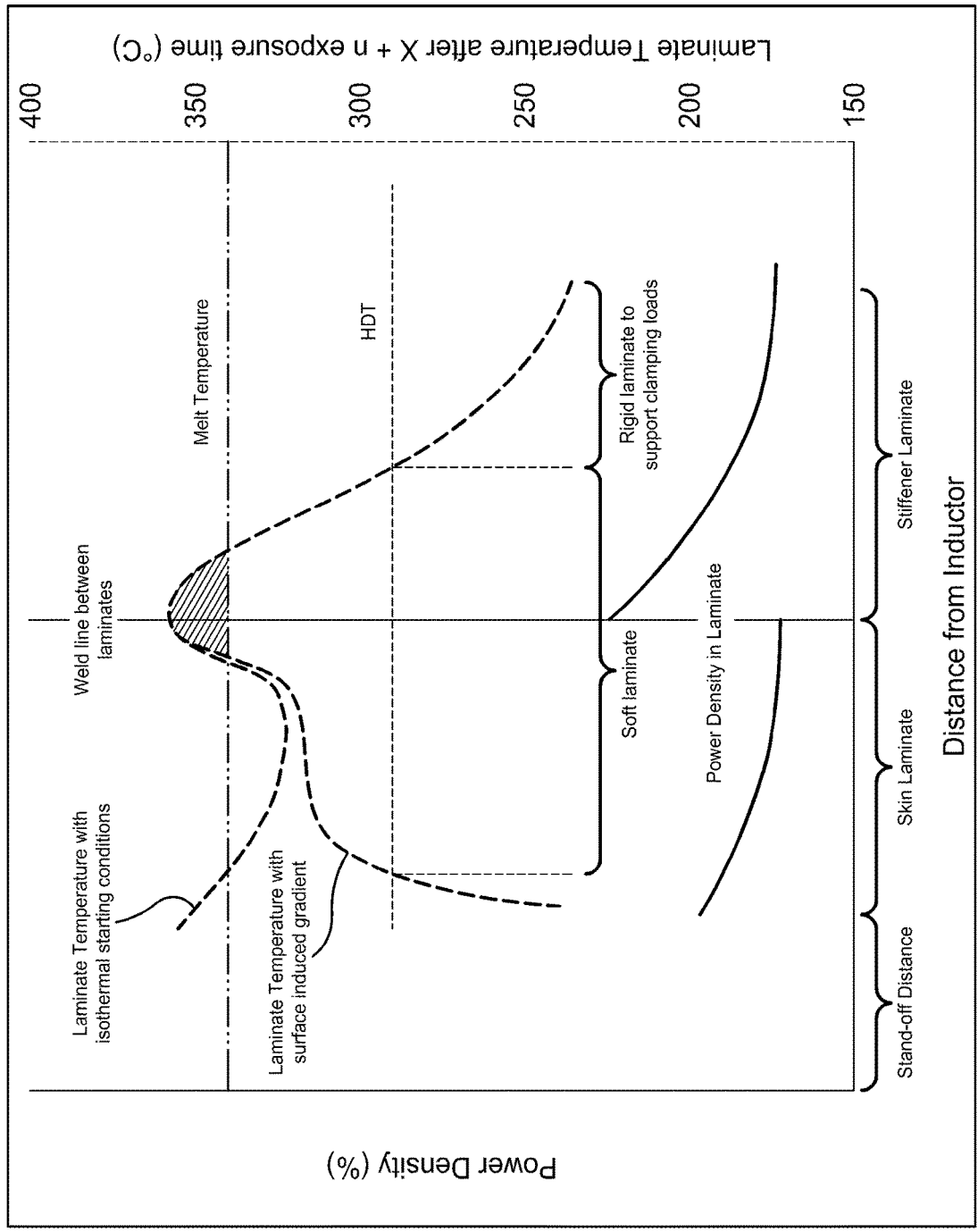
FIG. 14 is a power density and temperature profile graph in accordance with an embodiment of the invention.

The force applicator 404 may then be activated to apply a clamping force to the heat-side laminate 500 against the opposing laminate 502 with the welding shoe 410 being positioned adjacent the heat-side laminate 500, as shown in block 702. The clamping force may be distributed as pressure via the elastomeric pressure pad 426. The pressure should be substantially the same for testing steps and welding steps so that electrical properties of the heat-side laminate 500 and opposing laminate 502 exhibited during welding are replicated during testing. The elastomeric pressure pad 426 may also space the induction coil 422 from the heat-side laminate 500 to bring the heat-side laminate 500 into a relatively more dispersed and less intense magnetic field region during welding, as shown in FIG. 13.

The heat-side laminate 500 may then be cooled in a precooling stage so as to create a thermal gradient therein, as shown in block 704. For example, a cold fluid may be passed through the perforated plenum of the cooling element 408 and dispersed to the first side 504 of the heat-side laminate 500 to draw heat therefrom. In this way, the first side 504 of the heat-side laminate 500 may be cooled to $T_c$ from ambient temperature $T_{amb}$ whereas the second side 506 of the heat-side laminate 500 and the first and second sides 508, 510 of the opposing laminate 502 may be relatively warmer.

The second side 506 of the heat-side laminate 500 may then be welded to the first side 508 of the opposing laminate 502, as shown in block 706. Specifically, the primary power supply may provide an electrical current to the induction coil 422 to generate a magnetic field. The magnetic field induces eddy current heating in the heat-side laminate 500 and opposing laminate 502. The magnetic field may be controlled via the flux control material 424 in the welding shoe 410.

During welding, a temperature of the second side 506 of the heat-side laminate 500 and the first side 508 of the opposing laminate 502 at least temporarily surpasses a melt temperature $T_m$ such that matrix resin at those sides is molten. Meanwhile, a temperature of the first side 504 of the heat-side laminate 500, which is closer to the source of heat, peaks below a melt temperature $T_m$ due to the earlier-induced thermal gradient and the lower electrical conductivity of the heat-side laminate 500.

The induction coil 422 may then be turned off to effect a desired maximum temperature of the faying surfaces. The faying surfaces and the first side 504 of the heat-side laminate 500 may then begin to cool to $T_{amb}$ in a cooling stage, as shown in block 708. Meanwhile, pressure may be applied to the laminates 500, 502 via the elastomeric pressure pad 426 during the entire heating stage and into the cooling stage.

The above-described method provides several advantages. For example, the difference between the electrical conductivity of the heat-side laminate 500 and the electrical conductivity of the opposing laminate 502 helps ensure melting is centered near the faying surfaces while preventing coil side laminate deconsolidation, and the distance from the induction coil prevents far side laminate deconsolidation. Spacing the induction coil 422 from the heat-side laminate 500 also brings the heat-side laminate into a relatively more dispersed and less intense magnetic field region during welding, further ensuring melting is centered near the faying surfaces while preventing coil side laminate deconsolidation and opposing side laminate deconsolidation. This is particularly useful when external support cannot be used such as with inaccessible close-out joints.

The above methods can be combined. For example, laminates of different electrical conductivity may be used with in-situ testing method steps for a more comprehensive thermoplastic welding solution.

Having thus described various embodiments of the invention, what is claimed as new and desired to be protected by Letters Patent includes the following:

1. A method for thermoplastic composite welding, the method comprising steps of:
   placing a heat-side laminate prepared at a first consolidation pressure so as to have a first electrical conductivity, the heat-side laminate including opposing first and second sides, adjacent to a backing laminate prepared at a second consolidation pressure higher than the first consolidation pressure so as to have a second electrical conductivity with the first electrical conductivity being lower than the second electrical conductivity, the backing laminate including opposing first and second sides;
   inductively heating the heat-side laminate and the backing laminate to weld the second side of the heat-side laminate and the first side of the backing laminate together, the first electrical conductivity being lower than the second electrical conductivity resulting in the first side of the heat-side laminate staying below a temperature at which rigidity would be lost and thereby remaining rigid during the heating step.

2. The method of claim 1, further comprising a step of applying a force against the heat-side laminate.

3. The method of claim 2, further comprising a step of distributing the applied force to the heat-side laminate via a non-conductive compliant layer.

4. The method of claim 1, wherein the backing laminate is a substructure laminate.

5. The method of claim 4, wherein the backing laminate is a stiffener laminate.

6. The method of claim 1, wherein the first electrical conductivity is at least one order of magnitude lower than the second electrical conductivity.

7. The method of claim 1, wherein the heat-side laminate is a vacuum bag only (VBO) material and the backing laminate is a press or autoclave consolidated laminate.

8. The method of claim 1, wherein the inductive heating is performed via an induction coil, the method further comprising a step of spacing the induction coil from the heat-side laminate so that the heat-side laminate is subjected to a relatively more dispersed and less intense magnetic field region induced by the induction coil than if the induction coil was directly adjacent the heat-side laminate.

9. The method of claim 1, wherein at least a portion of the backing laminate stays below a temperature at which rigidity would be lost so the at least a portion of the backing laminate remains sufficiently rigid to provide back-end support to the heat-side laminate during the heating step.

10. The method of claim 1, wherein the backing laminate is inaccessible after the heat-side laminate is placed adjacent to the backing laminate.

11. The method of claim 1, further comprising a step of cooling the heat-side laminate so as to create a thermal gradient in the heat-side laminate.

12. The method of claim 1, wherein the heat-side laminate is a skin laminate.

13. A method for thermoplastic composite welding, the method comprising steps of:
placing a heat-side laminate including opposing first and second sides adjacent to a backing laminate including opposing first and second sides;
inductively heating the heat-side laminate and the backing laminate so the second side of the heat-side laminate and the first side of the backing laminate are welded together,
the heat-side laminate having a first electrical conductivity, the backing laminate having a second electrical conductivity, the first electrical conductivity being lower than the second electrical conductivity so that at least a portion of the heat-side laminate stays below a temperature at which rigidity would be lost and thereby remains rigid during the heating step;
inducing a test magnetic field into the welded heat-side laminate and backing laminate;
measuring an electrical characteristic resulting from the induced test magnetic field; and
performing an additional inductive heating step after the measuring step.

14. The method of claim 13, wherein the backing laminate is a substructure laminate.

15. The method of claim 14, wherein the backing laminate is a stiffener laminate.

16. The method of claim 13, wherein the steps of heating the heat-side laminate and inducing the test magnetic field are performed via a single power supply.

17. The method of claim 13, wherein the steps of heating the heat-side laminate and inducing the test magnetic field are performed via different coils.

18. The method of claim 13, wherein the step of inducing the test magnetic field includes generating a momentary current.

19. The method of claim 13, wherein the step of heating the heat-side laminate is achieved via a primary induction power supply and the step of inducing the test magnetic field is achieved via a secondary testing instrument.

20. The method of claim 13, further comprising a step of determining a desired welding parameter value from a look-up table corresponding to welding parameter values with the measured electrical characteristic.

21. The method of claim 13, further comprising a step of applying a force against the heat-side laminate during the heating step, the inducing step, and the measuring step.

22. The method of claim 13, further comprising a step of comparing a value of the measured electrical characteristic to a baseline test value.

23. The method of claim 13, wherein the additional inductive heating step is a rewelding step if the electrical characteristic measurement produces a value indicating an undesirable weld.

24. The method of claim 13, wherein the heat-side laminate is a skin laminate.

25. A method for thermoplastic composite welding, the method comprising steps of:
placing a heat-side laminate prepared at a first consolidation pressure so as to have a first electrical conductivity, the heat-side laminate including opposing first and second sides, adjacent to a backing laminate prepared at a second consolidation pressure higher than the first consolidation pressure so as to have a second electrical conductivity with the first electrical conductivity being lower than the second electrical conductivity, the backing laminate including opposing first and second sides;
inducing a test magnetic field into the heat-side laminate and the backing laminate;
measuring an electrical characteristic resulting from the induced test magnetic field;
adjusting a welding parameter to a desired welding parameter value based on the measured electrical characteristic;
cooling the heat-side laminate so as to create a thermal gradient in the heat-side laminate;
inductively heating the heat-side laminate and the backing laminate at least partially according to the adjusted welding parameter after the cooling step is initiated but before the thermal gradient dissipates such that the thermal gradient and the first electrical conductivity being lower than the second electrical conductivity cooperatively result in the first side of the heat-side laminate staying below a temperature at which rigidity would be lost and thereby remaining rigid during the heating step;
inducing a post-weld test magnetic field into the heat-side laminate and the backing laminate;
measuring a post-weld electrical characteristic resulting from the induced post-test magnetic field; and
repeating the heating step if the electrical characteristic measurement is an unacceptable value.

* * * * *